(12) United States Patent
Stiebels et al.

(10) Patent No.: US 9,999,877 B2
(45) Date of Patent: Jun. 19, 2018

(54) CU-CHA/FE-BEA MIXED ZEOLITE CATALYST AND PROCESS FOR THE TREATMENT OF $NO_x$ IN GAS STREAMS

(71) Applicant: BASF SE, Ludwigshafen (DE)

(72) Inventors: Susanne Stiebels, Adenbüttel (DE); Claudia Wendt, Hannover (DE); Torsten Neubauer, Langenhagen (DE); Svetlana Zimmermann, Nienburg (DE)

(73) Assignee: BASF SE, Ludwigshafen (DE)

( * ) Notice: Subject to any disclaimer, the term of this patent is extended or adjusted under 35 U.S.C. 154(b) by 0 days. days.

(21) Appl. No.: 13/645,100

(22) Filed: Oct. 4, 2012

(65) Prior Publication Data

US 2013/0089483 A1  Apr. 11, 2013

Related U.S. Application Data

(60) Provisional application No. 61/543,351, filed on Oct. 5, 2011.

(51) Int. Cl.
*B01D 53/56* (2006.01)
*B01J 29/04* (2006.01)
(Continued)

(52) U.S. Cl.
CPC ............ *B01J 29/04* (2013.01); *B01D 53/565* (2013.01); *B01D 53/9418* (2013.01);
(Continued)

(58) Field of Classification Search
None
See application file for complete search history.

(56) References Cited

U.S. PATENT DOCUMENTS 6,345,496 B1  2/2002  Fuwa et al.
7,332,148 B2  2/2008  Tran et al.
(Continued)

FOREIGN PATENT DOCUMENTS

CN  101674876  3/2010
CN  201280058642.6  6/2016
(Continued)

OTHER PUBLICATIONS

I.M. Saaid, A.R. Mohamed and S. Bhatia, "Catalytic Activity of ZSM-5 Zeolite Loaded with Transition Metals for the Selective Catalytic Reduction of NOx", AJSTD vol. 19 Issue 2 pp. 15-31 (2002).*

(Continued)

*Primary Examiner* — Anita Nassiri Motlagh
(74) *Attorney, Agent, or Firm* — Oblon, McClelland, Maier & Neustadt, L.L.P.

(57) ABSTRACT

The present invention relates to a catalyst, which may be used in selective catalytic reduction (SCR), said catalyst comprising one or more zeolites of the BEA structure type, one or more zeolites of the CHA structure type, and optionally one or more zeolites of the MFI structure type, wherein at least part of the one or more zeolites of the BEA structure type contain iron (Fe), wherein at least part of the one or more zeolites of the CHA structure type contain copper (Cu), and wherein at least part of the optional one or more zeolites of the MFI structure type contain iron (Fe). Furthermore, the present invention concerns an exhaust gas treatment system comprising said catalyst as well as a process for the treatment of a gas stream comprising $NO_x$ using said catalyst as well.

6 Claims, 1 Drawing Sheet

(51) Int. Cl.
*B01J 29/88* (2006.01)
*B01J 29/80* (2006.01)
*B01D 53/94* (2006.01)
*B01J 37/02* (2006.01)
B01J 29/46 (2006.01)
B01J 29/76 (2006.01)

(52) U.S. Cl.
CPC .............. *B01J 29/80* (2013.01); *B01J 29/88* (2013.01); *B01J 37/0244* (2013.01); *B01J 37/0246* (2013.01); *B01D 53/9477* (2013.01); *B01D 2255/20738* (2013.01); *B01D 2255/20761* (2013.01); *B01D 2255/502* (2013.01); *B01D 2255/504* (2013.01); *B01D 2258/012* (2013.01); *B01J 29/46* (2013.01); *B01J 29/763* (2013.01); *B01J 29/7615* (2013.01)

(56) References Cited

U.S. PATENT DOCUMENTS

| | | |
|---|---|---|
| 8,735,311 B2 | 5/2014 | Bull et al. |
| 2002/0039550 A1 | 4/2002 | Schafer-Sindlinger et al. |
| 2003/0143141 A1 | 7/2003 | Schwefer et al. |
| 2006/0014630 A1 | 1/2006 | Matsumoto et al. |
| 2008/0226545 A1* | 9/2008 | Bull et al. ............... 423/700 |
| 2009/0269265 A1 | 10/2009 | Ando et al. |
| 2010/0058746 A1 | 3/2010 | Pfeifer et al. |
| 2010/0092362 A1* | 4/2010 | Li et al. ............... 423/239.2 |
| 2010/0111796 A1* | 5/2010 | Caudle et al. ............... 423/239.2 |
| 2011/0305614 A1 | 12/2011 | Stiebels et al. |

FOREIGN PATENT DOCUMENTS

| | | |
|---|---|---|
| EP | 1147801 | 4/2001 |
| EP | 1579911 | 11/2003 |
| EP | 1961933 | 8/2008 |
| EP | 2027918 A1 * | 2/2009 |
| EP | 2123614 | 11/2009 |
| GB | 2475740 | 6/2011 |
| JP | 2007-76990 A | 3/2007 |
| JP | 2011/125849 | 6/2011 |
| JP | 2011-125851 A | 6/2011 |
| WO | WO-99/39809 | 8/1999 |
| WO | WO-2004/047960 | 6/2004 |
| WO | WO-2008/106519 | 9/2008 |
| WO | WO-2008/132452 | 11/2008 |
| WO | WO 2008132452 A2 * | 11/2008 |
| WO | WO-2009/099937 | 8/2009 |
| WO | WO 2011/064666 | 6/2011 |
| WO | WO 2011/118777 | 9/2011 |

OTHER PUBLICATIONS

"International Search Report in PCT/IB2012/055337", dated Mar. 7, 2013, 5 pgs.

PCT International Preliminary Report on Patentability in PCT/IB2012/055337, dated Apr. 17, 2014, 9 pages.

Extended European Search Report in EP12838536, dated Jun. 17, 2015, 7 pages.

Krocher, Oliver et al., Combination of V2O5-TiO2, Fe-ZSM5, and Cu-ZSM5 Catalysts for the Selective Catalytic Reduction of Nitric Oxide with Ammonia, *Ind. Eng. Chem. Res.* vol. 47 2008, 8588-8593.

Office Action dated Aug. 16, 2016 in Japanese Application No. 534028/2014 with English Translation.

Guangda, M., Air Pollution Control Technology Handbook (ed.) *Chemical Industry Press*, Sep. 30, 2010.

Heck, R.M., Catalytic Air Pollution Control, *Commercial Technology*, 2nd Edition, John Wiley & Sons, Inc., 2002.

\* cited by examiner

CU-CHA/FE-BEA MIXED ZEOLITE CATALYST AND PROCESS FOR THE TREATMENT OF $NO_x$ IN GAS STREAMS

CROSS-REFERENCE TO RELATED APPLICATIONS

This application claims priority to U.S. Provisional Application No. 61/543,351, filed on Oct. 5, 2011, the contents of which are hereby incorporated by reference in their entirety.

TECHNICAL FIELD

The present invention relates to a catalyst which may be for use in selective catalytic reduction (SCR), as well as to an exhaust gas treatment system comprising said catalyst, and to a process for the treatment of a gas stream comprising $NO_x$. In particular, the present invention is concerned with a method of catalyzing the reduction of nitrogen oxides, and especially with the selective reduction of nitrogen oxides with ammonia in the presence of oxygen, using metal-promoted zeolite catalysts.

BACKGROUND

The emissions present in the exhaust gas of a motor vehicle can be divided into two groups. Thus, the term "primary emission" refers to pollutant gases which form directly through the combustion process of the fuel in the engine and are already present in the untreated emission before it passes through an exhaust gas treatment system. Secondary emission refers to those pollutant gases which can form as by-products in the exhaust gas treatment system.

The exhaust gas of lean engines comprises, as well as the customary primary emissions of carbon monoxide CO, hydrocarbons HC and nitrogen oxides $NO_x$, a relatively high oxygen content of up to 15% by volume. In the case of diesel engines, there is additional particulate emission in addition to the gaseous primary emissions, which consists predominantly of soot residues, with or without organic agglomerates, and originates from partially incomplete fuel combustion in the cylinder.

In diesel engine applications, the use of specific diesel particulate filters is unavoidable for the removal of the particulate emissions. Furthermore, complying with the emissions limits prescribed by legislation in Europe and the United States requires nitrogen oxide removal from the exhaust gas ("denitrification"). Thus, although carbon monoxide and hydrocarbon pollutant gases from the lean exhaust gas can easily be rendered harmless by oxidation over a suitable oxidation catalyst, the reduction of the nitrogen oxides to nitrogen is much more difficult owing to the high oxygen content of the exhaust gas stream.

Known methods for removing nitrogen oxides from exhaust gases are firstly methods using nitrogen oxide storage catalysts (NSCs) and secondly methods for selective catalytic reduction (SCR) by means of ammonia over a suitable catalyst, SCR catalyst for short.

The cleaning action of nitrogen oxide storage catalysts is based on the nitrogen oxides being stored in a lean operating phase of the engine by the storage material of the storage catalyst, predominantly in the form of nitrates. When the storage capacity of the NSC is exhausted, the catalyst has to be regenerated in a subsequent rich operating phase of the engine. This means that the nitrates formed beforehand are decomposed and the nitrogen oxides released again are reacted with the reducing exhaust gas components over the storage catalyst to give nitrogen, carbon dioxide and water.

Since the implementation of a rich operating phase in diesel engines is not straightforward and the establishment of the rich exhaust gas conditions required for regeneration of the NSC frequently entails auxiliary measures such as fuel postinjection into the exhaust gas line, the alternative SCR method may be used for denitrification of diesel motor vehicle exhaust gases. In this method, according to the engine design and construction of the exhaust gas system, a distinction is made between "active" and "passive" SCR methods, "passive" SCR methods involving use of ammonia secondary emissions generated deliberately in the exhaust gas system as a reducing agent for denitrification.

For example, U.S. Pat. No. 6,345,496 B1 describes a method for cleaning engine exhaust gases, in which repeatedly alternating lean and rich air/fuel mixtures are established and the exhaust gas thus produced is passed through an exhaust gas system which comprises, on the inflow side, a catalyst which converts $NO_x$ to $NH_3$ only under rich exhaust gas conditions, while a further catalyst arranged on the outflow side adsorbs or stores $NO_x$ in the lean exhaust gas, and releases it under rich conditions, such that it can react with $NH_3$ generated by the inflow-side catalyst to give nitrogen. As an alternative, according to U.S. Pat. No. 6,345,496 B1, an $NH_3$ adsorption and oxidation catalyst may be arranged on the outflow side, which stores $NH_3$ under rich conditions, desorbs it under lean conditions and oxidizes it with oxygen to give nitrogen and water. Further disclosures of such methods are known. Like the use of the nitrogen oxide storage catalysts, however, such "passive" SCR methods have the disadvantage that one of their essential constituents is the provision of rich exhaust gas conditions, which are generally required for in situ generation of ammonia as a reducing agent.

Compared to this, in "active" SCR methods, the reducing agent is metered into the exhaust gas line from an addition tank carried in the vehicle by means of an injection nozzle. Such a reducing agent used may, apart from ammonia, also be a compound readily decomposable to ammonia, for example urea or ammonium carbamate. Ammonia has to be supplied to the exhaust gas at least in a stoichiometric ratio relative to the nitrogen oxides. Owing to the greatly varying operation conditions of the motor vehicles, the exact metered addition of the ammonia is not straightforward. This leads in some cases to considerable ammonia breakthroughs downstream of the SCR catalyst. To prevent secondary ammonia emission, an oxidation catalyst is usually arranged downstream of the SCR catalyst, which is intended to oxidize ammonia which breaks through to nitrogen. Such a catalyst is referred to hereinafter as an ammonia slip catalyst.

To remove particulate emissions from the exhaust gas of diesel motor vehicles, specific diesel particulate filters are used, which may be provided with an oxidation catalyst-containing coating to improve their properties. Such a coating serves to lower the activation energy for oxygen-based particulate burnoff (soot combustion) and hence to lower the soot ignition temperature on the filter, to improve the passive regeneration performance by oxidation of nitrogen monoxide present in the exhaust gas to nitrogen dioxide, and to suppress breakthroughs of hydrocarbon and carbon monoxide emissions.

If compliance with legal emissions standards requires both denitrification and removal of particulates from the exhaust gas of diesel motor vehicles, the described measures for removing individual pollutant gases are combined in a corresponding conventional exhaust gas system by connection in series. For example, WO 99/39809 describes an exhaust aftertreatment system wherein an oxidation catalyst for oxidation of NO in $NO_x$ to $NO_2$, a particulate filter, a metering unit for a reducing agent and an SCR catalyst follow on each other. To prevent ammonia breakthroughs, an additional ammonia slip catalyst is generally required downstream of the SCR catalyst, and continues the series of catalysts on the outflow side of the SCR catalyst.

In this respect, both synthetic and natural zeolites and their use in promoting certain reactions, including the selective reduction of nitrogen oxides with ammonia in the presence of oxygen, are well known in the art. Zeolites are aluminosilicate crystalline materials having rather uniform pore sizes which, depending upon the type of zeolite and the type and amount of cations included in the zeolite lattice, may range from about 3 to 10 angstroms in diameter.

EP 1 961 933 A1, for example, relates to a diesel particulate filter for treating exhaust gas comprising a filter body having provided thereon an oxidation catalyst coating, an SCR-active coating, and an ammonia storage material. Among the materials which may be used as the catalytically active component in the SCR reaction, said document mentions the use of zeolites selected from beta zeolite, Y-zeolite, faujasite, mordenite and ZSM-5 which may be exchanged with iron or copper.

EP 1 147 801 A1, on the other hand, relates to a process for reducing nitrogen oxides present in a lean exhaust gas from an internal combustion engine by SCR using ammonia, wherein the reduction catalyst may contain ZSM-5 zeolite exchanged with copper or iron. Said document further concerns an SCR catalyst having a honeycomb substrate and deposited thereon a coating containing ZSM-5 zeolite exchanged with iron.

EP 2 123 614 A2 for its part concerns a honeycomb structure containing zeolites and an inorganic binder. In particular, a first zeolite included in said structure is ion-exchange with a metal including Cu, Mn, Ag, and V, and a second zeolite is further included which is exchanged with a metal including Fe, Ti, and Co. Regarding the types of zeolites used for the first and second zeolite, these include zeolite beta, zeolite Y, ferrierite, ZSM-5 zeolite, mordenite, faujasite, zeolite A, and zeolite L.

U.S. Pat. No. 7,332,148 B2 describes a stabilized aluminosilicate zeolite containing copper or iron, wherein the stabilized zeolite includes ZSM-5, ZSM-8, ZSM-11, ZSM-12, zeolite X, zeolite Y, zeolite beta, mordenite, and erionite.

WO 2008/106519 A1 describes a zeolite having the CHA crystal structure and containing copper. Said document also discusses the use of such an ion-exchanged zeolite as an SCR catalyst.

EP 1 579 911 A1 discloses an exhaust gas purifying catalyst and a method fur purifying exhaust gas including reducing nitrogen oxides wherein the catalyst component includes ZSM-5 and zeolite beta onto both of which copper has been deposited.

US 2003/0143141 A1 relates to a method for the removal of $NO_x$ and $N_2O$ from process and waste gases, wherein the catalysts used therein contain one or more iron-loaded zeolites, wherein the iron loaded zeolites may be of the types MFI, BEA, FER, MOR, and/or MEL.

Finally, WO 2004/047960 A1 concerns a method for the preparation of multimetallic zeolite catalysts for $N_2O$ abatement, wherein the catalyst contains isomorphously substituted iron, and wherein the zeolite catalyst has a structure analogous to MFI and/or BEA.

Accordingly, the prior art relates an awareness of the utility of metal-promoted zeolite catalysts including, among others, iron-promoted and copper-promoted zeolite catalysts, in particular for the selective catalytic reduction of nitrogen oxides with ammonia.

Presently, however, increasingly strict legislature with respect to emissions, and in particular regarding motor vehicle exhaust gas emissions, requires improved catalysts and exhaust treatment systems using such catalysts for the treatment thereof. Thus, exhaust gas emission legislation in the European Union for exhaust gas emission stage Euro 6 now requires reduction of $NO_x$ emissions for most passenger cars powered by diesel engines. For this purpose, exhaust gas emissions are tested using the New European Driving Cycle (NEDC), also referred to as the MVEG (Motor Vehicle Emissions Group) cycle, which is laid down in European Union Directive 70/220/EEC. One way of meeting this requirement includes the application of SCR catalyst technology to the exhaust gas systems of the vehicles in question.

As opposed to the old European driving cycle (ECE-15) driving cycle, a particular feature of the NEDC is that it integrates a so-called extra-urban driving cycle, such that testing may better represent the typical usage of a car in Europe, and, accordingly, the typical emission pattern linked thereto. More specifically, in the NEDC, the old European driving cycle ECE-15 is performed in the time period of 0 to 800 seconds, after which the extra-urban driving cycle is conducted in the time period up to 1200 seconds.

SUMMARY

One aspect of the invention relates to a catalyst comprising one or more zeolites of the BEA structure type, one or more zeolites of the CHA structure type, and optionally one or more zeolites of the MFI structure type, wherein at least part of the one or more zeolites of the BEA structure type contain iron (Fe), wherein at least part of the one or more zeolites of the CHA structure type contain copper (Cu), and wherein at least part of the optional one or more zeolites of the MFI structure type contain iron (Fe). In one or more embodiments, the weight ratio of the one or more zeolites of the BEA structure type to the one or more zeolites of the CHA structure type, or if the catalyst comprises one or more zeolites of the MFI structure type, then the ratio of the total weight of the one or more zeolites of the BEA structure type and of the one or more zeolites of the MFI structure type to the weight of the one or more of the zeolites of the CHA structure type, ranges from 0.1 to 10. In one or more embodiments, one or more of the zeolites comprise both Al and Si in their respective zeolite frameworks.

In some embodiments, the molar ratio of silica to alumina (SAR) in the one or more zeolites of the BEA or of the MFI structure type respectively ranges from 5 to 150. In one or more embodiments, the catalyst comprises one or more zeolites of the MFI structure type, and wherein the molar ratio of silica to alumina (SAR) in the one or more zeolites of the BEA structure type ranges from 5 to 200.

In one or more embodiments, the molar ratio of silica to alumina (SAR) in the one or more zeolites of the CHA structure type ranges from 5 to 100. In some embodiments, the amount of Fe in the one or more zeolites of the BEA structure type, or if the catalyst comprises one or more zeolites of the MFI structure type, then the average amount of Fe in the one or more zeolites of the BEA structure type and in the one or more zeolites of the MFI structure type, ranges from 0.05 to 15 wt.-% based on the weight of said one or more zeolites.

In some embodiments, the catalyst comprises one or more zeolites of the MFI structure type, wherein the amount of Fe in the one or more zeolites of the BEA structure type ranges from 0.01 to 10 wt.-% based on the weight of said one or more zeolites, and wherein the amount of Fe in the one or more zeolites of the MFI structure type ranges from 0.1 to 15 wt.-% based on the weight of said one or more zeolites. In one or more embodiments, the amount of Cu in the one or more zeolites of the CHA structure type ranges from 0.05 to 20 wt.-% based on the weight of said one or more zeolites. In some embodiment, said catalyst further comprises a substrate onto which the one or more zeolites are provided. In one or more embodiments, the substrate is selected from the group consisting of flow-through substrates and wall-flow substrates.

In one or more embodiments, the catalyst comprises one or more layers provided on the substrate, the zeolites being contained in one single layer or two or more separate layers. In some embodiments, the one or more zeolites of the CHA structure type are present in the catalyst in a loading ranging from 0.1 to 8 g/in$^3$. In one or more embodiments, the loading of the one or more zeolites of the BEA structure type, or if the catalyst comprises one or more zeolites of the MFI structure type, then the total loading of the one or more zeolites of the BEA structure type and of the one or more zeolites of the MFI structure type, ranges from 0.05 to 5 g/in$^3$. In some embodiments, a catalyst of any of the embodiments described above is comprised in an exhaust gas treatment system comprising an internal combustion engine and an exhaust gas conduit in fluid communication with the internal combustion engine, wherein said catalyst is present in the exhaust gas conduit.

Another aspect of the invention relates to an exhaust gas treatment system comprising an internal combustion engine and an exhaust gas conduit in fluid communication with the internal combustion engine, wherein a catalyst according to any of the embodiments described above is present in the exhaust gas conduit. In one or more embodiments, said exhaust gas treatment system further comprising an oxidation catalyst and/or a catalyzed soot filter (CSF), wherein the oxidation catalyst is a diesel oxidation catalyst (DOC) in instances where the internal combustion engine is a diesel engine.

A third aspect of the invention relates to a process for the treatment of a gas stream comprising $NO_x$ comprising conducting said gas stream over and/or through a catalyst according to any of the embodiments described above. In one or more embodiments, the gas stream comprises ammonia and/or urea. In some embodiments, prior to the contacting of the catalyst with the gas stream, the $NO_2$ content thereof is 80 wt.-% or less based on 100 wt.-% of $NO_x$.

DETAILED DESCRIPTION

In one or more embodiments, provide an improved catalyst, in particular for use in selective catalytic reduction, wherein said catalyst is, for example, better adapted to the actual emission conditions encountered in motor vehicle use, such as for example those encountered in the NEDC.

In this respect, it has surprisingly been found that according to embodiments of the present invention as outlined in the following, an improved catalyst may be provided. In particular, it has unexpectedly been found that a catalyst comprising zeolites of both the BEA and of the CHA structure type, wherein the BEA-type zeolites contain iron and the CHA-type zeolites contain copper, display clearly improved catalytic properties, in particular when used in SCR applications.

Thus, aspects of the present invention relate to a catalyst, which may be used in selective catalytic reduction (SCR), said catalyst comprising
one or more zeolites of the BEA structure type,
one or more zeolites of the CHA structure type, and optionally
one or more zeolites of the MFI structure type,
wherein at least part of the one or more zeolites of the BEA structure type contain iron (Fe),
wherein at least part of the one or more zeolites of the CHA structure type contain copper (Cu), and
wherein at least part of the optional one or more zeolites of the MFI structure type contain iron (Fe).

Within the meaning of the present invention, the term "selective catalytic reduction" abbreviated as "SCR" refers to any catalytic process involving the reaction of nitrogen oxides $NO_x$ with a reductant. In particular, SCR refers to reduction reactions, wherein $NO_x$ is transformed to a reduction product thereof, which may be $N_2$. Regarding the term "reductant", said term refers to any suitable reducing agent for the SCR process. In some embodiments, the reductant comprises ammonia and/or any ammonia precursor, such as urea and/or ammonium carbamate, urea may be comprised by an ammonia precursor. In some further embodiments, the term "reductant" refers to ammonia. The term "reductant" may, however, further include hydrocarbons and/or hydrocarbon derivatives such as oxygenated hydrocarbons, such as for example those which may be found in motor vehicle fuels and/or in motor vehicle exhaust gas, in particular in diesel fuel and/or diesel exhaust gas.

According to aspects of the present invention, any conceivable zeolite of the BEA or of the CHA structure type may be used, respectively, provided that it displays the typical structural characteristics of that structure-type. With respect to the one or more zeolites of the BEA structure, these may for example comprise one or more zeolites selected from the group consisting of Beta, [B—Si—O]-BEA, [Ga—Si—O]-BEA, [Ti—Si—O]-BEA, Al-rich beta, CIT-6, Tschernichite, pure silica beta and mixtures of two or more thereof. According to some embodiments of the present invention, the one or more zeolites of the BEA structure type include zeolite Beta.

Concerning the one or more zeolites of the CHA structure, these may comprise one or more zeolites selected from the group consisting of chabazite, AlP, [Al—As—O]-CHA, [Co—Al—P—O]-CHA, [Mg—Al—P—O]-CHA, [Si—O]-CHA, [Zn—Al—P—O]-CHA, [Zn—As—O]-CHA, |Co| [Be—P—O]-CHA, |Li—Na|[Al—Si—O]-CHAO-34, CoAPO-44, CoAPO-47, DAF-5, Dehydrated Na-Chabazite, GaPO-34, K-Chabazite, LZ-218, Linde D, Linde R, MeAPO-47, MeAPSO-47, Ni(deta)$_2$-UT-6, Phi, SAPO-34, SAPO-47, SSZ-13, SSZ-62, UiO-21, Willhendersonite, ZK-14, ZYT-6, and mixtures of two or more thereof. According to some embodiments of the present invention, the one or more zeolites of the CHA structure type comprise one or more zeolites selected from the group consisting of chabazite, SSZ-13, LZ-218, Linde D, Linde R, Phi, ZK-14, and ZYT-6, and mixtures of two or more thereof, wherein in further embodiements, the one or more zeolites of the CHA structure type include chabazite.

Furthermore, with respect to particular embodiments of the present invention further comprising one or more zeolites of the MFI structure type, any conceivable zeolite of the MFI structure type may be used, provided that it displays the typical structural characteristics of that structure type. Thus, by way of example, the one or more zeolites of the MFI structure type optionally contained in the inventive catalyst may comprise one or more zeolites selected from the group consisting of ZSM-5, [As—Si—O]-MFI, [Fe—Si—O]-MFI, [Ga—Si—O]-MFI, AMS-1B, AZ-1, Bor-C, Boralite C, Encilite, FZ-1, LZ-105, Monoclinic H-ZSM-5, Mutinaite, NU-4, NU-5, Silicalite, TS-1, TSZ, TSZ-III, TZ-01, USC-4, USI-108, ZBH, ZKQ-1B, ZMQ-TB, organic-free ZSM-5, and mixtures of two or more thereof. According to some embodiments of the present invention, the one or more zeolites of the MFI structure type include ZSM-5.

According to some other embodiments of the present invention, however, the inventive catalyst does not comprise one or more zeolites of the MFI structure type.

According to some embodiments of the present invention, the one or more zeolites of the BEA structure type include zeolite Beta and the one or more zeolites of the CHA structure type comprise one or more zeolites selected from the group consisting of chabazite, SSZ-13, LZ-218, Linde D, Linde R, Phi, ZK-14, and ZYT-6, and mixtures of two or more thereof, wherein in further embodiments, the one or more zeolites of the BEA structure type include zeolite Beta and the one or more zeolites of the CHA structure type include chabazite. According to some embodiments, the one or more zeolites of the BEA structure type is zeolite Beta and the one or more zeolites of the CHA structure type is chabazite.

Furthermore, according to particular embodiments of the present invention further comprising one or more zeolites of the MFI structure type, the one or more zeolites of the BEA structure type include zeolite Beta, that the one or more zeolites of the CHA structure type comprise one or more zeolites selected from the group consisting of chabazite, SSZ-13, LZ-218, Linde D, Linde R, Phi, ZK-14, and ZYT-6, and mixtures of two or more thereof, and that the one or more zeolites of the MFI structure type include ZSM-5. In further embodiments, the one or more zeolites of the BEA structure type include zeolite Beta, the one or more zeolites of the CHA structure type include chabazite, and the one or more zeolites of the MFI structure type include ZSM-5. According to even further embodiments thereof, the one or more zeolites of the BEA structure type is zeolite Beta, the one or more zeolites of the CHA structure type is chabazite, and the one or more zeolites of the MFI structure type is ZSM-5.

According to some embodiments of the present invention, at least part of the one or more BEA-type zeolites contain iron and at least part of the one or more CHA-type zeolites contain copper. Furthermore, in some embodiments, at least part of the optional one or more MFI-type zeolites contain iron. It is, however, not excluded according to some embodiments of the present invention that the catalyst comprising one or more BEA-type zeolites at least partially containing iron and one or more CHA-type zeolites at least partially containing copper further comprises one or more MFI-type zeolites which does not contain iron. In some embodiments of the present invention, however, one or more MFI-type zeolites optionally contained in the inventive catalyst, and in further embodiments at least partially contain iron.

With respect to the iron contained in at least part of the one or more BEA-type zeolites and the copper contained in at least part of the one or more CHA-type zeolites, as well as the iron contained in the one or more MFI-type zeolites optionally contained in the inventive catalyst, said metals may respectively be contained therein in any conceivable fashion and in any conceivable state. Thus, according to some embodiments of the present invention, there is no particular limitation with respect to the oxidation state of iron and copper contained in the catalyst, nor with respect to the way in which they are contained in the respective type of zeolite. In some embodiments, however, iron and/or copper, and in even further embodiments, both iron and copper, respectively display a positive state of oxidation in the respective zeolite. Furthermore, iron and/or copper may be contained on the zeolite surface and/or within the porous structure of the respective zeolite framework. Alternatively or in addition to being supported on the zeolite surface and/or within the porous structure thereof, iron and/or copper may be included in the zeolite framework, for example by isomorphous substitution. According to some embodiments, the iron and/or copper, and in further embodiments, both iron and copper, are supported on the respective zeolite surface and/or within the porous structure thereof, and in further embodiments both on the respective zeolite surface and within the porous structure thereof. According to particularly some embodiments of the present invention, both iron and copper are respectively contained in at least part of the one or more zeolites of the BEA, CHA, and optional MFI structure type in a positive oxidation state, wherein said iron and copper is supported on the surface of the respective zeolite, including being contained within the porous structure thereof.

The catalyst according to one or more embodiments of the present invention may comprise the one or more zeolites of the BEA structure type and the one or more zeolites of the CHA structure type in any conceivable weight ratio, wherein in some embodiments, the weight ratio of the one or more zeolites of the BEA structure type to the one or more zeolites of the CHA structure type ranges from 0.1 to 10, or from 0.2 to 7, and in further embodiments from 0.3 to 4, and in even further embodiments from 0.35 to 2, and in even further embodiments from 0.4 to 1, and in even further embodiments from 0.45 to 0.5, and in even further embodiments from 0.47 to 0.48. According to some embodiments of the present invention, the weight ratio of the BEA-type zeolites to the CHA-type zeolites is about 0.475.

Furthermore, according to particular embodiments of the present invention further containing one or more zeolites of the MFI structure type in the inventive catalyst, any conceivable weight ratio of said one or more zeolites of the MFI structure type to the one or more zeolites of the CHA structure type and/or to the one or more zeolites of the BEA structure type may be used. In some embodiment, the ratio of the total weight of the one or more zeolites of the BEA structure type and of the one or more zeolites of the MFI structure type to the weight of the one or more zeolites of CHA structure type ranges from 0.1 to 10, from 0.2 to 7, from 0.3 to 4, from 0.35 to 2, from 0.4 to 1, from 0.45 to 0.5, or from 0.47 to 0.48. According to some embodiments of the present invention, the ratio of the combined weight of the BEA- and MFI-type zeolites to the CHA-type zeolites is about 0.475.

Thus, according to some embodiments of the present invention, the weight ratio of the one or more zeolites of the BEA structure type to the one or more zeolites of the CHA structure type, or if the catalyst comprises one or more zeolites of the MFI structure type, then the ratio of the total weight of the one or more zeolites of the BEA structure type and of the one or more zeolites of the MFI structure type to the weight of the one or more of the zeolites of the CHA structure type, ranges from 0.1 to 10, from 0.2 to 7, from 0.3 to 4, from 0.35 to 2, from 0.4 to 1, from 0.45 to 0.5, or from 0.47 to 0.48.

According to some embodiments of the present invention, the one or more zeolites of the BEA structure type and/or the one or more zeolites of the CHA structure type respectively comprise both Al and Si in their frameworks, wherein in some embodiments, both the zeolites of the BEA structure type and the zeolites of the CHA structure type respectively comprise both Al and Si in their frameworks. Furthermore, according to some embodiments of the present invention wherein one or more zeolites of the MFI structure type is further contained in the inventive catalyst, said one or more zeolites comprise both Al and Si in their frameworks. In further embodiments, the one or more zeolites of the CHA, BEA, and MFI structure types respectively comprise both Al and Si in their respective frameworks.

Thus, according to some embodiments of the present invention, one or more of the zeolites, and in further embodiments, all of the zeolites, comprise both Al and Si in their respective zeolite frameworks.

With respect to embodiments of the present invention wherein one or more of the zeolites comprise both Al and Si in their respective frameworks, said zeolites may in principle display any possible ratio of Al to Si. In embodiments of the present invention wherein one or more zeolites of the BEA structure type comprise both Al and Si in their framework, the molar ratio of silica to alumina (SAR) in the one or more zeolites of the BEA structure type may range from 5 to 150, from 15 to 100, from 20 to 50, from 23 to 30, or from 25 to 27. Furthermore, in some embodiments of the present invention wherein one or more zeolites of the CHA structure type comprise both Al and Si in their framework, the SAR in the one or more zeolites of the CHA structure type may range from 5 to 100, from 10 to 70, from 20 to 55, from 25 to 35, or from 28 to 32. According to some embodiments of the present invention wherein one or more zeolites of both the BEA and the CHA structure type respectively comprise Al and Si in their framework, the SAR in the one or more BEA-type zeolites may range from 5 to 150, and the one or more CHA-type zeolites may range from 5 to 100, or that the SAR in the one or more BEA-type zeolites may range from 15 to 100, and/or the one or more CHA-type zeolites may range from 10 to 70, and/or the SAR in the one or more BEA-type zeolites may range from 20 to 50, and/or the one or more CHA-type zeolites may range from 20 to 55, and/or the SAR in the one or more BEA-type zeolites may range from 23 to 30, and/or the one or more CHA-type zeolites may range from 25 to 35, and/or the SAR in the one or more BEA-type zeolites may range from 25 to 27, and/or the one or more CHA-type zeolites may range from 28 to 32.

Furthermore, according to some embodiments of the present invention wherein the inventive catalyst further comprises one or more zeolites of the MFI structure type comprising Al and Si in their framework, said zeolites may in principle display any possible ratio of Al to Si. Thus, by way of example, the silica to alumina (SAR) ratio in the one or more zeolites of the MFI structure type may range anywhere from 5 to 150, wherein in some embodiments the SAR ranges from 15 to 100, from 20 to 50, from 23 to 30, or from 25 to 27. Furthermore, according to some embodiments thereof wherein the both the MFI and BEA structure type respectively comprise Al and Si in their framework, the SAR of the one or more zeolites of the BEA structure type may range from 5 to 200, from 15 to 150, from 25 to 60, from 35 to 45, or from 38 to 42. According to further embodiments the SAR in the one or more BEA-type zeolites ranges from 5 to 200, and the one or more MFI-type zeolites ranges from 5 to 150, and/or the SAR in the one or more BEA-type zeolites may range from 15 to 150, and/or the one or more MFI-type zeolites may range from 15 to 100, and/or the SAR in the one or more BEA-type zeolites may range from 25 to 60, and/or the one or more MFI-type zeolites may range from 20 to 50, and/or the SAR in the one or more BEA-type zeolites may range from 35 to 45, and/or the one or more MFI-type zeolites may range from 23 to 30, and/or the SAR in the one or more BEA-type zeolites may range from 38 to 42, and/or the one or more MFI-type zeolites may range from 25 to 27.

Therefore, according to some embodiments of the present invention wherein the catalyst comprises one or more zeolites of the MFI structure type, the molar ratio of silica to alumina (SAR) in the one or more zeolites of the BEA structure type ranges from 5 to 200, from 15 to 150, from 25 to 60, from 35 to 45, or from 38 to 42.

Regarding the iron contained in the BEA- and optional MFI-type zeolites and the amount of copper contained in the CHA-type zeolites, there is no particular limitation according to the present invention as to their respective amounts. It is, however, in some embodiments, that the amount of iron (Fe) in the one or more zeolites of the BEA structure type is comprised in the range of from 0.05 to 15 wt.-% based on the weight of said one or more zeolites of the BEA structure type, and in further embodiments, the amount of Fe ranges from 0.1 to 10 wt.-%, from 0.5 to 7 wt.-%, from 1 to 5 wt.-%, from 1.5 to 3 wt.-%, from 2 to 2.8 wt.-%, from 2.2 to 2.6 wt.-%, or from 2.3 to 2.55 wt.-%. Furthermore, in some embodiments, the amount of copper (Cu) in the one or more zeolites of the CHA structure type ranges from 0.05 to 20 wt.-% based on the weight of said one or more zeolites of the CHA structure type. In further embodiments, the amount of Cu ranges from 0.1 to 15 wt.-%, from 0.5 to 10 wt.-%, from 1 to 7 wt.-%, from 1.5 to 5 wt.-%, from 2 to 4 wt.-%, from 2.5 to 3.5 wt.-%, from 2.7 to 3.3 wt.-%, or from 2.9 to 3.1 wt.-%.

According to some embodiments of the present invention, the amount of iron in the one or more BEA-type zeolites ranges from 0.05 to 15 wt.-%, and the amount of copper in the one or more CHA-type zeolites ranges from 0.05 to 20 wt.-%, wherein in some embodiments, the amount of iron in the one or more BEA-type zeolites ranges from 0.5 to 7 wt.-%, and the amount of copper in the one or more CHA-type zeolites ranges from 0.5 to 10 wt.-%, or the amount of iron in the one or more BEA-type zeolites ranges from 1.5 to 3 wt.-%, and the amount of copper in the one or more CHA-type zeolites ranges from 1.5 to 5 wt.-%, or the amount of iron in the one or more BEA-type zeolites ranges from 2.2 to 2.6 wt.-%, and the amount of copper in the one or more CHA-type zeolites ranges from 2.5 to 3.5 wt.-%, or the amount of iron in the one or more BEA-type zeolites ranges from 2.3 to 2.55 wt.-%, and the amount of copper in the one or more CHA-type zeolites ranges from 2.9 to 3.1 wt.-%.

Furthermore, according to particular embodiments of the present invention wherein the inventive catalyst further contains one or more zeolites of the MFI structure type, the average amount of iron (Fe) in the one or more zeolites of the BEA structure type and the one or more zeolites of the MFI structure type is comprised in the range of from 0.05 to 15 wt.-% based on the weight of said one or more zeolites, or the amount of Fe ranges from 0.1 to 10 wt.-%, from 0.5 to 7 wt.-%, from 1 to 5 wt.-%, from 1.5 to 3 wt.-%, 2 to 2.8 wt.-%, from 2.2 to 2.6 wt.-%, or from 2.3 to 2.55 wt.-%. In particular, within the meaning of the present invention, the average amount of iron in the one or more zeolites of the BEA and MFI structure types designates the amount of iron contained in total in the one or more zeolites of both the BEA and MFI structure types based on the total weight of the one or more zeolites of both the BEA and MFI structure types.

Thus, according to some embodiments of the present invention, the amount of Fe in the one or more zeolites of the BEA structure type, or if the catalyst comprises one or more zeolites of the MFI structure type, then the average amount of Fe in the one or more zeolites of the BEA structure type and in the one or more zeolites of the MFI structure type, ranges from 0.05 to 15 wt.-% based on the weight of said one or more zeolites, wherein in some embodiments, the amount of Fe ranges from 0.1 to 10 wt.-%, or from 0.5 to 7 wt.-%, or from 1 to 5 wt.-%, or from 1.5 to 3 wt.-%, or 2 to 2.8 wt.-%, or from 2.2 to 2.6 wt.-%, or from 2.3 to 2.55 wt.-%.

According to some embodiments of the present invention wherein the catalyst comprises one or more zeolites of the MFI structure type at least partly containing iron, there is no particular restriction as to the amount of iron respectively contained in the MFI- and BEA-type zeolites, in particular with respect to the distribution of the total amount of iron contained in both the MFI- and BEA-type zeolites among said MFI- and BEA-type zeolites. Thus, by way of example, according to said particular embodiments the amount of iron contained in the one or more zeolites of the BEA structure type may range anywhere from 0.01 to 10 wt.-% based on the weight of said one or more zeolites of the BEA structure type and the amount of iron in the one or more zeolites of the MFI structure type ranges from 0.1 to 15 wt.-% based on the weight of said one or more zeolites of the MFI structure type. According to embodiments of the present invention the amount of iron contained in the one or more zeolites of the BEA structure type ranges from 0.05 to 7 wt.-%, and the one or more zeolites of the MFI structure type ranges ranges from 0.5 to 10 wt.-%, or that the one or more zeolites of the BEA structure type ranges from 0.1 to 5 wt.-%, and the one or more zeolites of the MFI structure type ranges ranges from 1.0 to 7.0 wt.-%, or that the one or more zeolites of the BEA structure type ranges from 0.5 to 2 wt.-%, and the one or more zeolites of the MFI structure type ranges ranges from 2.5 to 5.5 wt.-%, or the one or more zeolites of the BEA structure type ranges from 1 to 1.6 wt.-%, and the one or more zeolites of the MFI structure type ranges ranges from 3.5 to 4.2 wt.-%, or the one or more zeolites of the BEA structure type ranges from 1.2 to 1.4 wt.-% based on the weight of said one or more zeolites of the BEA structure type, and the one or more zeolites of the MFI structure type ranges ranges from 3.7 to 4.0 wt.-% based on the weight of said one or more zeolites of the MFI structure type.

Therefore, according to some embodiments of the present invention, the catalyst comprises one or more zeolites of the MFI structure type,
wherein the amount of Fe in the one or more zeolites of the BEA structure type ranges from 0.01 to 10 wt.-% based on the weight of said one or more zeolites, the amount of Fe in the one or more zeolites of the BEA structure type ranges from 0.05 to 7 wt.-%, or from 0.1 to 5 wt.-%, or from 0.3 to 3 wt.-%, or from 0.5 to 2 wt.-%, or from 1 to 1.6 wt.-%, or from 1.2 to 1.4 wt.-%, and wherein the amount of Fe in the one or more zeolites of the MFI structure type ranges from 0.1 to 15 wt.-% based on the weight of said one or more zeolites, wherein the amount of Fe in the one or more zeolites of the MFI structure type ranges from 0.5 to 10 wt.-%, or from 1.0 to 7.0 wt.-%, or from 2.5 to 5.5 wt.-%, or from 3.5 to 4.2 wt.-%, or from 3.7 to 4.0 wt.-%.

According to one or more embodiments of the present invention, the catalyst may be provided in any conceivable form, such as by way of example in the form of a powder, a granulate, or a monolith. In this respect, some embodiments relate to where the catalyst further comprises a substrate, onto which the one or more zeolites are provided. In general, the substrate can be made from materials commonly known in the art. For this purpose, porous materials may be used as the substrate material, in particular ceramic and ceramic-like materials such as cordierite, $\alpha$-alumina, an aluminosilicate, cordierite-alumina, silicon carbide, aluminum titanate, silicon nitride, zirconia, mullite, zircon, zircon mullite, zircon silicate, sillimanite, a magnesium silicate, petalite, spodumene, alumina-silica-magnesia and zirconium silicate, as well as porous refractory metals and oxides thereof. According to one or more embodiments of the present invention, "refractory metal" refers to one or more metals selected from the group consisting of Ti, Zr, Hf, V, Nb, Ta, Cr, Mo, W, and Re. The substrate may also be formed of ceramic fiber composite materials. According to some embodiments of the present invention, the substrate may be formed from cordierite, silicon carbide, and/or from aluminum titanate, or from cordierite and/or silicon carbide.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt.-% of the alloy, e.g., 10-25 wt.-% of chromium, 3-8 wt.-% of aluminum and up to 20 wt.-% of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates.

Furthermore, the substrate according to one or more embodiments of the present invention may be of any conceivable shape, provided that it allows for the fluid contact with at least a portion of the respective one or more zeolites of the BEA and CHA structure types and optionally of the MFI structure type present thereon. In some embodiments, the substrate is a monolith, and in some embodiments, the monolith is a flow-through monolith. Suitable substrates include any of those materials typically used for preparing catalysts, and will usually comprise a ceramic or metal honeycomb structure. Accordingly, the monolithic substrate contains fine, parallel gas flow passages extending from an inlet to an outlet face of the substrate, such that passages are open to fluid flow (referred to as honeycomb flow through substrates). The passages, which are essentially straight paths from their fluid inlet to their fluid outlet, are defined by walls onto which the one or more zeolites of the BEA and CHA structure types and optionally of the MFI structure type are respectively disposed, so that the gases flowing through the passages may contact them. The flow passages of the monolithic substrate are thin-walled channels, which can be of any suitable cross-sectional shape and size such as trapezoidal, rectangular, square, sinusoidal, hexagonal, oval, or circular. Such structures may contain up to 900 gas inlet openings (i.e., cells) per square inch of cross section, wherein according to some embodiments, the structures have from 50 to 600 openings per square inch, from 300 to 500, or from 350 to 400.

Thus, according to some embodiment of the present invention, the catalyst comprises a substrate may be a monolith, and in some embodiments, a honeycomb substrate, onto which the one or more zeolites are provided.

According to further embodiments of the present invention, the substrate is a wall flow monolith. For these embodiments, the substrate may be a honeycomb wall flow filter, wound or packed fiber filter, open-cell foam, or sintered metal filter, wherein wall flow filters are some. As for flow through monoliths, useful wall flow substrates have a plurality of fine, substantially parallel gas flow passages extending along the longitudinal axis of the substrate. Typically, each passage is blocked at one end of the substrate body, with alternate passages blocked at opposite end-faces. Some wall flow substrates for use in the present invention include thin porous walled honeycomb monoliths, through which a fluid stream may pass without causing too great an increase in back pressure or pressure across the catalyst. Ceramic wall flow substrates used in the present invention may be formed of a material having a porosity of at least 40%, or from 40 to 70%, and having a mean pore size of at least 5 microns, or from 5 to 30 microns. Further embodiments relate to substrates having a porosity of at least 50% and having a mean pore size of at least 10 microns.

Thus, according to one or more embodiments of the present invention, the substrate may be comprised in the catalyst may be selected from the group consisting of flow-through substrates and wall-flow substrates, or from the group consisting of cordierite flow-through substrates and wall-flow substrates, and silicon carbide flow-through substrates and wall-flow substrates.

In general, according to embodiments of the present invention which further comprise a substrate, the zeolites may be provided thereon in any conceivable fashion, wherein they may be provided thereon in the form of one or more layers which may be washcoat layers. In some embodiments of the present invention, wherein the catalyst comprises a substrate and two or more layers provided thereon, the zeolites may be provided in said two or more layers in any possible manner. Accordingly, the present invention includes, for example, such embodiments wherein the zeolites are contained in only a single of the two or more layers, as well as embodiments wherein the zeolite is contained in more than one of the two or more layers. In some embodiments, however, the zeolites are contained in a single layer, irrespective of the number of layers present on the substrate.

Thus, according to some embodiments of the present invention wherein the catalyst comprises a substrate. In further embodiments, the catalyst comprises one or more layers, in some embodiments washcoat layers, provided on the substrate, the zeolites being contained in one single layer or two or more separate layers, wherein in further embodiments, the zeolites are contained in one single layer.

In further embodiments of the present invention comprising a substrate and two or more layers provided thereon, wherein the zeolites are contained in more than one of said layers, there is no particular limitation as to the distribution of the one or more zeolites of the BEA and the CHA structure type among said more than one layers which comprise said zeolites. Thus, it is principally possible according to one or more embodiments of the present invention, that, for example, the BEA- and CHA-type zeolites are respectively contained in each of the layers which contain zeolites, or that, alternatively, only part of the layers containing zeolites contain both BEA- and CHA-type zeolites. Furthermore, it is possible according to said further embodiments of the present invention that no single layer contains both BEA- and CHA-type zeolites, said zeolites being accordingly contained in separate layers of the catalyst. According some embodiments, at least one of the layers in such embodiments contains both BEA- and CHA-type zeolites. In further embodiments, each of the two or more layers of said embodiments containing the zeolites also contains both the BEA- and CHA-type zeolites.

Furthermore, according to particular embodiments of the present invention wherein the catalyst further comprises one or more zeolites of the MFI structure type, there is no particular limitation as to the distribution of the one or more zeolites of the BEA, CHA, and MFI structure type among the more than one layers which comprise said zeolites in some embodiments of the present invention wherein the catalyst comprises a substrate having one or more layers provided thereon. Thus, it is principally possible according to one or more embodiments of the present invention, that, for example, the BEA-, CHA-, and MFI-type zeolites are respectively contained in each of the layers which contain zeolites, or that, alternatively, only part of the layers containing zeolites contain all three BEA-, CHA-, and MFI-type zeolites. Furthermore, it is possible according to said further embodiments of the present invention that no single layer contains all three BEA-, CHA-, and MFI-type zeolites, one or two of said zeolite types being accordingly contained in separate layers of the catalyst. According to some embodiments of the present invention, at least one of the layers in such embodiments contains all three BEA-, CHA-, and MFI-type zeolites. In further embodiments, each of the two or more layers of said embodiments containing the zeolites also contains all three of the BEA-, CHA-, and MFI-type zeolites.

Thus, according to some embodiments of the present invention wherein the catalyst comprises a substrate onto which the one or more zeolites are provided, the catalyst comprises one or more layers, particularly washcoat layers, provided on the substrate, the zeolites being contained in one single layer or two or more separate layers, wherein, in some embodiments, the zeolites are contained in one single layer.

In principle, the one or more zeolites of the BEA and of the CHA structure type may be respectively present in the catalyst in any conceivable amount, provided that an improved catalyst according to one or more embodiments of the present invention may be obtained. Thus, by way of example, the one or more zeolites of the CHA structure type may be present in the catalyst in a loading ranging from 0.5 to 5 $g/in^3$, wherein the loading may range from 0.9 to 3.5 $g/in^3$, or from 1.2 to 3 $g/in^3$, or from 1.5 to 2.5 $g/in^3$, or from 1.75 to 2.25 $g/in^3$, and even or from 1.9 to 2.1 $g/in^3$. By further way of example and independently thereof, the one or more zeolites of the BEA structure type may be present in the catalyst in a loading ranging from 0.05 to 5 $g/in^3$, wherein the loading may range from 0.1 to 3 $g/in^3$, or from 0.3 to 2.5 $g/in^3$, or from 0.5 to 2 $g/in^3$, or from 0.7 to 1.5 $g/in^3$, or from 0.8 to 1.2 $g/in^3$, or from 0.9 to 1 $g/in^3$. In particular, the respective loadings of the BEA- and CHA-type zeolites may be independent from one another, in the sense that the loading ranges may apply either to the BEA- or to the CHA-type zeolites, wherein the loading of the one or more zeolites belonging to the other structure type is respectively not particularly limited, and may therefore be present in any loading.

Furthermore, according to some embodiments of the present invention comprising one or more zeolites of the MFI structure type, the one or more zeolites of the BEA, CHA, and MFI structure type may be respectively present in the catalyst in any conceivable amount, provided that an improved catalyst according to one or more embodiments of the present invention may be obtained. According to some embodiments, the total loading of the one or more zeolites of the BEA structure type and the total loading of the one or more zeolites of the MFI structure ranges from 0.05 to 5 g/in$^3$, or from 0.1 to 3 g/in$^3$, or from 0.3 to 2.5 g/in$^3$, or from 0.5 to 2 g/in$^3$, or from 0.7 to 1.5 g/in$^3$, or from 0.8 to 1.2 g/in$^3$, or from 0.9 to 1 g/in$^3$. According to said some embodiments, there is no particular restriction as to the respective amount of the one or more zeolites of the BEA and of the MFI structure type. Thus by way of example, the respective amounts of the one or more zeolites of the BEA and/or MFI structure types may range anywhere from 0.025 to 2.5 g/in$^3$, wherein, in one or more embodiments, the one or more zeolites of the BEA and/or of the MFI structure types range from 0.05 to 1.5 g/in$^3$, or from 0.15 to 1.25 g/in$^3$, or from 0.25 to 1 g/in$^3$, or from 0.35 to 0.75 g/in$^3$, or from 0.4 to 0.6 g/in$^3$, or from 0.45 to 0.5 g/in$^3$. According to a some embodiment of the present invention, the one or more zeolites of the BEA structure type as well as the one or more zeolites of the MFI structure type are each contained in the inventive catalyst in a loading of about 0.475 g/in$^3$, respectively.

By further way of example and independently thereof, the one or more zeolites of the BEA structure type may be present in the catalyst in a loading ranging from 0.05 to 5 g/in$^3$, wherein the loading may range from 0.1 to 3 g/in$^3$, or from 0.3 to 2.5 g/in$^3$, or from 0.5 to 2 g/in$^3$, or from 0.7 to 1.5 g/in$^3$, or from 0.8 to 1.2 g/in$^3$, or from 0.9 to 1 g/in$^3$. In particular, the respective loadings of the BEA- and CHA-type zeolites may be independent from one another, in the sense that the loading ranges may apply either to the BEA- or to the CHA-type zeolites, wherein the loading of the one or more zeolites belonging to the other structure type is respectively not particularly limited, and may therefore be present in any loading.

Therefore, according to some embodiments the present invention the inventive catalyst the loading of the one or more zeolites of the BEA structure type, or
if the catalyst comprises one or more zeolites of the MFI structure type, then the total loading of the one or more zeolites of the BEA structure type and of the one or more zeolites of the MFI structure type, ranges from 0.05 to 5 g/in$^3$, or from 0.1 to 3 g/in$^3$, or from 0.3 to 2.5 g/in$^3$, or from 0.5 to 2 g/in$^3$, or from 0.7 to 1.5 g/in$^3$, or from 0.8 to 1.2 g/in$^3$, or from 0.9 to 1 g/in$^3$.

In addition to the above-mentioned catalyst, the present invention also relates to a treatment system for an exhaust gas stream. In particular, the treatment system of the present invention comprises an internal combustion engine which may be a lean burn engine, or a diesel engine. According to one or more embodiments of the present invention, it is however also possible to use a lean burn gasoline engine in said treatment system.

Furthermore, the treatment system according to one or more embodiments of the present invention comprises an exhaust gas conduit which is in fluid communication with the internal combustion engine. In this respect, any conceivable conduit may be used, provided that it is capable of conducting exhaust gas from an internal combustion engine, and may sufficiently resist the temperatures and the chemical species encountered in the exhaust gas of an internal combustion engine, in particular of a lean burn engine such as a diesel engine. Within the meaning of the present invention, the fluid communication provided between the exhaust gas conduit and the internal combustion engine signifies that the treatment system allows for the constant passage of exhaust gas from the engine to the conduit.

According to the exhaust gas treatment system of the present invention, the catalyst is present in the exhaust gas conduit. In general, the catalyst may be provided in the exhaust gas conduit in any conceivable fashion, provided that it is present within the exhaust gas conduit in the sense that it may be contacted by the exhaust gas passing through said conduit. In some embodiments, the catalyst is provided in the exhaust gas conduit on a substrate as outlined in the present application, and in particular on a honeycomb substrate, which may be either a flow-through or a wall-flow honeycomb substrate.

Thus, the present invention also relates to an exhaust gas treatment system comprising an internal combustion engine and an exhaust gas conduit in fluid communication with the internal combustion engine, wherein the catalyst according to one or more embodiments of the present invention is present in the exhaust gas conduit, and wherein the internal combustion engine may be a lean burn engine, or a diesel engine.

In this respect and independently thereof, the present invention also relates to embodiments wherein the inventive catalyst is comprised in an exhaust gas treatment system comprising an internal combustion engine and an exhaust gas conduit in fluid communication with the internal combustion engine, wherein said catalyst is present in the exhaust gas conduit, and wherein the internal combustion engine may be a lean burn engine, or more specifically a diesel engine.

According to some embodiments of the present invention, the exhaust gas treatment system further comprises a means of introducing a reductant into the exhaust gas stream, wherein said means is located upstream from the inventive BEA/CHA-zeolite catalyst. In one or more embodiments, a means of introducing ammonia and/or urea into the exhaust gas conduit is provided. In this respect, any means known to the skilled person may be provided, in particular those commonly applied to exhaust gas treatment systems operating with active SCR methods necessitating the direct introduction of said reductants. According to some embodiments, the reductant may comprise ammonia and/or urea is introduced by the means of an injection nozzle provided in the exhaust gas conduit upstream from the inventive catalyst.

Within the meaning of the present invention, the exhaust gas treatment system may suitably further comprise any further components for the effective treatment of an exhaust gas. In particular, said system may further comprise an oxidation catalyst or a catalyzed soot filter (CSF) or both an oxidation catalyst and a CSF. According to said embodiments, the oxidation catalyst and/or the CSF are also present within the exhaust gas conduit.

In the present invention, any suitable CSF can be used, provided that it may effectively oxidize soot which may be contained in the exhaust gas. To this effect, the CSF of the present invention may comprise a substrate coated with a washcoat layer containing one or more catalysts for burning off trapped soot and/or oxidizing exhaust gas stream emissions. In general, the soot burning catalyst can be any known catalyst for combustion of soot. For example, the CSF can be coated with a one or more high surface area refractory oxides (such as e.g. alumina, silica, silica alumina, zirconia, and zirconia alumina) and/or with an oxidation catalyst (such as e.g. a ceria-zirconia) for the combustion of unburned hydrocarbons and to some degree particulate matter. However, in some embodiments, the soot burning catalyst is an oxidation catalyst comprising one or more precious metal catalysts, said one or more precious metal catalysts may, in some embodiments, comprise one or more metals selected from the group consisting of platinum, palladium, and rhodium.

Regarding the oxidation catalyst which may be comprised in the exhaust gas treatment system instead of or in addition to a CSF, any oxidation catalyst may be used to this effect which is suitable for oxidizing unburned hydrocarbons, CO, and/or $NO_x$ comprised in the exhaust gas. In particular, oxidation catalysts may comprise one or more precious metal catalysts, or more specifically one or more precious metals selected from the group consisting of platinum, palladium, and rhodium. According to some embodiments of the present invention, wherein the internal combustion engine of the exhaust gas treatment system is a diesel engine, the oxidation catalyst may be a diesel oxidation catalyst. In particular, within the meaning of the present invention, a "diesel oxidation catalyst" refers to any oxidation catalyst which is particularly well adapted to the oxidation of diesel exhaust gas, in particular with respect to the temperatures and to the composition of diesel exhaust gas encountered in the treatment thereof.

According to some embodiments, the exhaust gas treatment system further comprises a CSF, or both a CSF and an oxidation catalyst. In further embodiments, the exhaust gas treatment system further comprises a CSF and a diesel oxidation catalyst.

In principle, in embodiments of the exhaust gas treatment system which further comprise an oxidation catalyst and/or a CSF, said further components may be present in the exhaust gas conduit in any order and at any emplacement therein, provided that the effective treatment of an exhaust gas may be provided. In particular, however, the presence and/or order and/or location of said further components may depend on the type, on the state, in particular with respect to the temperature and pressure thereof, and on the average composition of the exhaust gas which is treated. Thus depending on the application of the exhaust gas treatment system, the present invention includes some embodiments wherein the oxidation catalyst and/or the CSF are located upstream or downstream from the inventive BEA/CHA-zeolite catalyst, as well as some embodiments comprising both an oxidation catalyst and a CSF, wherein the oxidation catalyst is located upstream and the CSF downstream thereof, or wherein, vice versa, the CSF is located upstream, and the oxidation catalyst downstream thereof. According to some embodiments of the present invention, the oxidation catalyst and/or the CSF are located upstream from the inventive BEA/CHA-zeolite catalyst, wherein in further embodiments, the exhaust gas treatment system comprises both an oxidation catalyst and a CSF upstream from the inventive BEA/CHA-zeolite catalyst. Within the meaning of the present invention, "upstream" and "downstream" relates to the direction of flow of the exhaust gas through the exhaust gas conduit in fluid communication with the internal combustion engine.

Thus, the present invention also relates to an exhaust gas treatment system as defined in the foregoing, said exhaust gas treatment system further comprising an oxidation catalyst and/or a catalyzed soot filter (CSF), wherein the oxidation catalyst and/or the CSF may be located upstream from the inventive BEA/CHA-zeolite catalyst, and wherein the oxidation catalyst is a diesel oxidation catalyst (DOC) in instances where the internal combustion engine is a diesel engine.

Furthermore, as outlined in the foregoing, the exhaust gas treatment system may further include a means of introducing a reductant into the exhaust gas conduit, said means being located upstream from the inventive BEA/CHA-zeolite catalyst. In particular, said means enables the introduction of a reductant comprising ammonia and/or urea into the exhaust gas conduit. Accordingly, the present invention also relates to an exhaust gas treatment system wherein in addition to or instead of further comprising an oxidation catalyst and/or a catalyzed soot filter (CSF) respectively may be located upstream from the inventive BEA/CHA-zeolite catalyst, the oxidation catalyst being a diesel oxidation catalyst (DOC) in instances where the internal combustion engine is a diesel engine, said system further comprises a means of introducing a reductant may comprise ammonia and/or urea into the exhaust gas conduit, said means being located upstream of the inventive BEA/CHA-zeolite catalyst.

According to further embodiments of the present invention, the exhaust gas treatment system further comprises an ammonia slip catalyst located downstream of the BEA/CHA-zeolite catalyst for oxidizing excess ammonia and/or urea which has not reacted in the SCR. Regarding the ammonia slip catalyst, said catalyst may be provided in the exhaust gas conduit in any manner commonly known in the art, provided that it may effectively oxidize said excess ammonia and/or urea. In particular, said embodiments involve an exhaust gas treatment systems according to one or more embodiments of the present invention which include a means of introducing a reductant into the exhaust gas conduit as defined in the foregoing.

In addition to a catalyst and to an exhaust gas treatment system comprising said catalyst, the present invention further concerns a process for the treatment of a gas stream comprising $NO_x$. In general, in the process of the present invention, any suitable gas stream comprising $NO_x$ may be employed, provided that its state and composition are both suited for being treated when contacted with a BEA/CHA-zeolite catalyst according to one or more embodiments of the present invention, wherein said treatment may at least in part involves the selective catalytic reduction of at least part of the $NO_x$ contained in said gas. For this purpose, the gas stream used in the inventive process may contain at least one reductant, which may be ammonia and/or any ammonia precursor such as urea and/or ammonium carbamate, urea may be comprised in the ammonia precursor. According to further embodiments of the inventive process, however, the gas stream used may also contain hydrocarbons and/or hydrocarbon derivatives such as oxygenated hydrocarbons, such as for example those which may be found in motor vehicle fuels and/or in motor vehicle exhaust gas, in particular in diesel fuel and/or exhaust gas. Said further reductants may be contained in the gas treated in the inventive process either in addition to ammonia, or, according to further embodiments, may also be contained therein instead of ammonia. According to one or more embodiments of the present invention, it is however some that the gas comprises ammonia and/or urea as a reducing agent for the treatment of exhaust gas emissions, in particular via SCR.

Thus, the present invention also relates to a process for the treatment of a gas stream comprising $NO_x$ as defined in the present application, wherein the gas stream comprises ammonia and/or urea.

Regarding the content of reductant in the gas stream, said reductant may comprise ammonia and/or urea, there is no particular limitation in this respect, provided that at least part of the $NO_x$ in said gas may be reduced by SCR when contacting the BEA/CHA-zeolite catalyst of the present invention. In some embodiments, said content does not considerably derive from the amount of reductant necessary for the maximal conversion of $NO_x$ by the catalyst. In this respect, the maximal conversion reflects the maximum amount of $NO_x$ which may be converted by SCR at a given time point in the inventive process, i.e. relative to the actual state and condition of both the catalyst and the gas to be treated upon contacting thereof, and in particular depending on the content of the reductant and, may, depending on the amount of ammonia and/or urea contained therein. Accordingly, the maximal conversion of $NO_x$ directly reflects the maximum amount of reductant, and may be of ammonia and/or urea, which may react with $NO_x$ in the SCR process at a given time point.

According to some embodiments of the present invention, the gas stream used in the inventive process may be an exhaust gas stream comprising $NO_x$. In this respect, there is no particular limitation as to the process which leads to such an exhaust gas stream, provided that it is suited for treatment with the BEA/CHA-zeolite catalyst according to one or more embodiments of the present invention, or may be processed to a gas stream suited for treatment with such a catalyst. According to some embodiments of the inventive process the exhaust gas stream is an exhaust gas stream resulting from an internal combustion engine, or from a lean burn engine. According to some embodiments, the exhaust gas stream is a diesel engine exhaust gas stream.

In the process according to one or more embodiments of the present invention, the gas stream is contacted with the inventive BEA/CHA-zeolite catalyst for treatment thereof, wherein said contacting is achieved by either conducting the gas stream over the catalyst, or conducting the gas stream through the catalyst. Said contacting may, however, also be achieved by conducting the gas stream both over and through the inventive catalyst. According to some embodiments, the gas stream is either conducted over the catalyst, wherein the catalyst may comprise a flow-through substrate for this purpose, or the gas stream is conducted through the catalyst, wherein in this case the catalyst may comprise a wall-flow substrate. When using a wall-flow substrate, however, there are instances wherein, depending on the process conditions and the specific form and dimensions of the catalyst, at least a portion of the gas stream may also be conducted over the catalyst. According some embodiments of the inventive process, the catalyst used in the inventive process either comprises a wall-flow honeycomb substrate or a flow-through honeycomb substrate.

Thus, the present invention also relates to a process for the treatment of a gas stream comprising $NO_x$ comprising conducting said gas stream over and/or through an BEA/CHA-zeolite catalyst according to one or more embodiments of the present invention, wherein the gas stream may be an exhaust gas stream, or particularly an exhaust gas stream resulting from an internal combustion engine, or a diesel exhaust gas stream.

In the inventive process, there is no particular limitation as to the amount of $NO_x$ contained in the gas stream, wherein in some embodiments, the amount thereof in the gas streams used in the inventive process does not exceed 10 wt.-% based on the total weight of the exhaust gas, or more specifically does not exceed 1 wt.-%, or 0.5 wt.-%, or 0.1 wt-%, or 0.05 wt-. %, or 0.03 wt-. %, or does not exceed 0.01 wt.-%.

Regarding the specific composition of the $NO_x$ fraction contained in the gas stream treated in the inventive process, there is no limitation as to the type or to the content of specific nitrous oxide gases $NO_x$ contained therein. According to specific embodiments of the present invention, in some embodiments, however, the $NO_2$-content relative to the total $NO_x$-content is 80 wt.-% or less based on 100 wt.-% of $NO_x$, wherein or particularly, the $NO_2$ content is comprised in the range of from 5 to 70 wt.-%, or from 10 to 60 wt.-%, or from 15 to 55 wt.-%, or from 20 to 50 wt.-%.

In general, the composition of the gas stream used in the inventive process as defined in the present application refers to the gas stream prior to its use in the inventive process, and in particular prior to the contacting thereof with the catalyst. In some embodiments, however, said composition refers to the gas stream's composition immediately prior to contacting the catalyst, i.e. immediately before treatment thereof begins by catalyzed chemical conversion thereof.

Thus, the present invention also relates to a process for the treatment of a gas stream comprising $NO_x$ as defined in the present application, wherein prior to the contacting of the catalyst with the gas stream, the $NO_2$ content thereof is 80 wt.-% or less based on 100 wt.-% of $NO_x$, wherein the $NO_2$ content may be comprised in the range of from 5 to 70 wt.-%, or from 10 to 60 wt.-%, or from 15 to 55 wt.-%, or from 20 to 50 wt.-%.

The catalyst according to one or more embodiments of the present invention can be readily prepared by processes well known in the prior art. A representative process is set forth below. As used herein, the term "washcoat" has its usual meaning in the art of a thin, adherent coating of a catalytic or other material applied to a substrate carrier material, such as a honeycomb-type carrier member, which may be sufficiently porous to permit the passage there through of the gas stream being treated.

The several zeolite components of the catalyst may be applied to the substrate as mixtures of one or more components in sequential steps in a manner which will be readily apparent to those skilled in the art of catalyst manufacture. A typical method of manufacturing the catalyst of the present invention is to respectively provide the at least one zeolite of the BEA structure type containing iron (Fe), the at least one further zeolite of the CHA structure type containing copper (Cu), and optionally at least one zeolite of the MFI structure type containing iron (Fe) as a coating or washcoat layer on the walls of a some flow-through or wall-flow honeycomb substrate. According to certain embodiments of the present invention, the zeolites are provided in a single washcoat on the substrate.

In one or more embodiments, the catalyst according to one or more embodiments of the present invention may be prepared by further using at least one binder, wherein any conceivable binder used in the art of catalyst manufacture, and in particular in the art of automotive SCR catalyst manufacture, may be used. In this respect, a silica-alumina binder is for example used for the preparation of the inventive catalyst, wherein said binder may be provided together with one or more of the zeolite components, and may be provided together with the zeolite components in one or more coatings on a substrate, or particularly in one or more washcoat layers.

For preparing the inventive catalyst, the components of one or possibly more washcoat layers may respectively be processed to a slurry, particularly to an aqueous slurry. The substrate may then be sequentially immersed into the respective slurries for applying the individual washcoats, after which excess slurry is removed to provide a thin coating of the two or more slurries on the walls of the substrate. The coated substrate is then dried and may be calcined to provide an adherent coating of the respective component to the walls of the substrate. Thus, for example, after providing a first washcoat layer on the substrate, and possibly drying and/or calcining the coated substrate, the resulting coated substrate may then be immersed into a further slurry to form a second washcoat layer deposited over the first washcoat layer. Again, the substrate may then be dried and/or calcined and eventually coated with a third washcoat, which again may subsequently be dried and/or calcined to provide a finished catalyst in accordance with one embodiment of the present invention. Regarding the steps of drying, washing, and calcining of the catalyst coated in this fashion, these may be respectively performed in the manner well known in the art of catalyst manufacture, in particular regarding the solvents and/or solutions used for washing the coated catalyst, as well as regarding the temperature, duration, and the atmosphere employed in the steps of drying and calcination, respectively. Concerning the step of calcination, any possible temperature may be used therein, provided that the process leads to the desired transformations in the catalyst without causing any notable or substantial deterioration of the catalysts stability, in particular with regard to its use in SCR. Thus, in certain cases, the temperature of calcination will not exceed 700° C., or 650° C., or particularly 600° C., or will not exceed 550° C. Thus, calcination may for example be conducted at a temperature comprised in the range of from 500° C. to 650° C., or 550° C. to 600° C., or particularly 570° C. to 590° C., or at a temperature comprised in the range of from 575° C. to 585° C.

In some embodiments, when preparing the inventive catalyst in the above-mentioned manner, no washing of the washcoat layers is performed after the application and optional drying thereof.

Accordingly, the catalyst of the present invention may be prepared according to a process comprising
(a) providing at least one zeolite of the BEA structure type, at least one further zeolite selected from zeolites of the CHA structure type, and optionally one or more zeolites of the MFI structure type, wherein at least part of the one or more zeolites of the BEA structure type contain iron, wherein at least part of the one or more further zeolites of the CHA structure type contain copper, and wherein at least part of the one or more zeolites of the MFI structure type contain iron;
(b) preparing one or more washcoat compositions respectively comprising one or more of the zeolites;
(c) applying the one or more woashcoat compositions in one more respective layers onto the substrate, wherein a step of drying is optionally conducted after the respective application of one or more of the individual layers;
(d) optionally washing and/or drying the coated substrate, wherein the coated substrate may be not washed; and
(e) optionally subjecting the coated substrate to a calcination process.

The present invention includes the following embodiments, wherein these include the specific combinations of embodiments as indicated by the respective interdependencies defined therein:
1. A catalyst, which may be used in selective catalytic reduction (SCR), said catalyst comprising
   one or more zeolites of the BEA structure type,
   one or more zeolites of the CHA structure type, and optionally one or more zeolites of the MFI structure type,
   wherein at least part of the one or more zeolites of the BEA structure type contain iron (Fe),
   wherein at least part of the one or more zeolites of the CHA structure type contain copper (Cu), and
   wherein at least part of the optional one or more zeolites of the MFI structure type contain iron (Fe).
2. The catalyst of embodiment 1, wherein the weight ratio of the one or more zeolites of the BEA structure type to the one or more zeolites of the CHA structure type, or if the catalyst comprises one or more zeolites of the MFI structure type, then the ratio of the total weight of the one or more zeolites of the BEA structure type and of the one or more zeolites of the MFI structure type to the weight of the one or more of the zeolites of the CHA structure type, ranges from 0.1 to 10, or from 0.2 to 7, or from 0.3 to 4, or from 0.35 to 2, or from 0.4 to 1, or from 0.45 to 0.5, or from 0.47 to 0.48.
3. The catalyst of embodiments 1 or 2, wherein one or more or all of the zeolites, and in some embodiments, all of the zeolites, comprise both Al and Si in their respective zeolite frameworks.
4. The catalyst of embodiment 3, wherein the molar ratio of silica to alumina (SAR) in the one or more zeolites of the BEA or of the MFI structure type respectively ranges from 5 to 150, or from 15 to 100, or from 20 to 50, or from 23 to 30, or from 25 to 27.
5. The catalyst of embodiment 3 or 4, wherein the catalyst comprises one or more zeolites of the MFI structure type, and wherein the molar ratio of silica to alumina (SAR) in the one or more zeolites of the BEA structure type ranges from 5 to 200, or from 15 to 150, or from 25 to 60, or from 35 to 45, or from 38 to 42.
6. The catalyst of any of embodiments 3 to 5, wherein the molar ratio of silica to alumina (SAR) in the one or more zeolites of the CHA structure type ranges from 5 to 100, or from 10 to 70, or from 20 to 55, or from 25 to 35, or from 28 to 32.
7. The catalyst of any of embodiments 1 to 6, wherein the amount of Fe in the one or more zeolites of the BEA structure type, or if the catalyst comprises one or more zeolites of the MFI structure type, then the average amount of Fe in the one or more zeolites of the BEA structure type and in the one or more zeolites of the MFI structure type, ranges from 0.05 to 15 wt.-% based on the weight of said one or more zeolites, wherein in further embodiments, the amount of Fe ranges from 0.1 to 10 wt.-%, or from 0.5 to 7 wt.-%, or from 1 to 5 wt.-%, or from 1.5 to 3 wt.-%, or 2 to 2.8 wt.-%, or from 2.2 to 2.6 wt.-%, or from 2.3 to 2.55 wt.-%.
8. The catalyst of embodiment 7, wherein the catalyst comprises one or more zeolites of the MFI structure type, wherein the amount of Fe in the one or more zeolites of the BEA structure type ranges from 0.01 to 10 wt.-% based on the weight of said one or more zeolites, wherein in further embodiments, the amount of Fe in the one or more zeolites of the BEA structure type ranges from 0.05 to 7 wt.-%, or from 0.1 to 5 wt.-%, or from 0.3 to 3 wt.-%, or from 0.5 to 2 wt.-%, or from 1 to 1.6 wt.-%, or from 1.2 to 1.4 wt.-%, and wherein the amount of Fe in the one or more zeolites of the MFI structure type ranges from 0.1 to 15 wt.-% based on the weight of said one or more zeolites, wherein in further embodiments, the amount of Fe in the one or more zeolites of the MFI structure type ranges from 0.5 to 10 wt.-%, or from 1.0 to 7.0 wt.-%, or from 2.5 to 5.5 wt.-%, or from 3.5 to 4.2 wt.-%, or from 3.7 to 4.0 wt.-%.
9. The catalyst of any of embodiments 1 to 8, wherein the amount of Cu in the one or more zeolites of the CHA structure type ranges from 0.05 to 20 wt.-% based on the weight of said one or more zeolites, wherein in further embodiments, the amount of Cu ranges from 0.1 to 15 wt.-%, or from 0.5 to 10 wt.-%, or from 1 to 7 wt.-%, or from 1.5 to 5 wt.-%, or from 2 to 4 wt.-%, or from 2.5 to 3.5 wt.-%, or from 2.7 to 3.3 wt.-%, or from 2.9 to 3.1 wt.-%.
10. The catalyst of any of embodiments 1 to 9, wherein said catalyst further comprises a substrate, in further embodiments, a honeycomb substrate, onto which the one or more zeolites are provided.
11. The catalyst of embodiment 10 wherein the substrate is selected from the group consisting of flow-through substrates and wall-flow substrates, in further embodiments, from the group consisting of cordierite flow-through substrates and wall-flow substrates, and silicon carbide flow-through substrates and wall-flow substrates.
12. The catalyst of embodiment 10 or 11, wherein the catalyst comprises one or more layers, in further embodiments, washcoat layers, provided on the substrate, the zeolites being contained in one single layer or two or more separate layers, wherein in further embodiments, the zeolites are contained in one single layer.
13. The catalyst of any of embodiments 1 to 12, wherein the one or more zeolites of the CHA structure type are present in the catalyst in a loading ranging from 0.1 to 8 g/in$^3$, or from 0.5 to 5 g/in$^3$, or from 0.9 to 3.5 g/in$^3$, or from 1.2 to 3 g/in$^3$, or from 1.5 to 2.5 g/in$^3$, or from 1.75 to 2.25 g/in$^3$, or from 1.9 to 2.1 g/in$^3$.
14. The catalyst of any of embodiments 1 to 13, wherein the loading of the one or more zeolites of the BEA structure type, or if the catalyst comprises one or more zeolites of the MFI structure type, then the total loading of the one or more zeolites of the BEA structure type and of the one or more zeolites of the MFI structure type, ranges from 0.05 to 5 g/in$^3$, or from 0.1 to 3 g/in$^3$, or from 0.3 to 2.5 g/in$^3$, or from 0.5 to 2 g/in$^3$, or from 0.7 to 1.5 g/in$^3$, or from 0.8 to 1.2 g/in$^3$, or from 0.9 to 1 g/in$^3$.
15. The catalyst of any of embodiments 1 to 14, comprised in an exhaust gas treatment system comprising an internal combustion engine and an exhaust gas conduit in fluid communication with the internal combustion engine, wherein said catalyst is present in the exhaust gas conduit, and wherein the internal combustion engine may be a lean burn engine, or more specifically a diesel engine.
16. An exhaust gas treatment system comprising an internal combustion engine and an exhaust gas conduit in fluid communication with the internal combustion engine, wherein a catalyst according to any of embodiments 1 to 14 is present in the exhaust gas conduit, and
   wherein the internal combustion engine may be a lean burn engine, or more specifically a diesel engine.
17. The exhaust gas treatment system of embodiment 16, said exhaust gas treatment system further comprising an oxidation catalyst and/or a catalyzed soot filter (CSF), wherein the oxidation catalyst and/or the CSF may be located upstream from the catalyst according to any of embodiments 1 to 14, and wherein the oxidation catalyst is a diesel oxidation catalyst (DOC) in instances where the internal combustion engine is a diesel engine.
18. A process for the treatment of a gas stream comprising NO$_x$ comprising conducting said gas stream over and/or through a catalyst according to any one of embodiments 1 to 14, wherein the gas stream may be an exhaust gas stream, or particularly an exhaust gas stream resulting from an internal combustion engine, or a diesel exhaust gas stream.
19. The process for the treatment of a gas stream comprising NO$_x$ according to embodiment 18, wherein the gas stream comprises ammonia and/or urea.
20. The process for the treatment of a gas stream comprising NO$_x$ according to embodiment 18 or 19, wherein prior to the contacting of the catalyst with the gas stream, the NO$_2$ content thereof is 80 wt.-% or less based on 100 wt.-% of NO$_x$, wherein in further embodiments, the NO$_2$ content is comprised in the range of from 5 to 70 wt.-%, or from 10 to 60 wt.-%, or from 15 to 55 wt.-%, or from 20 to 50 wt.-%.

FIGURES

Figure 1:
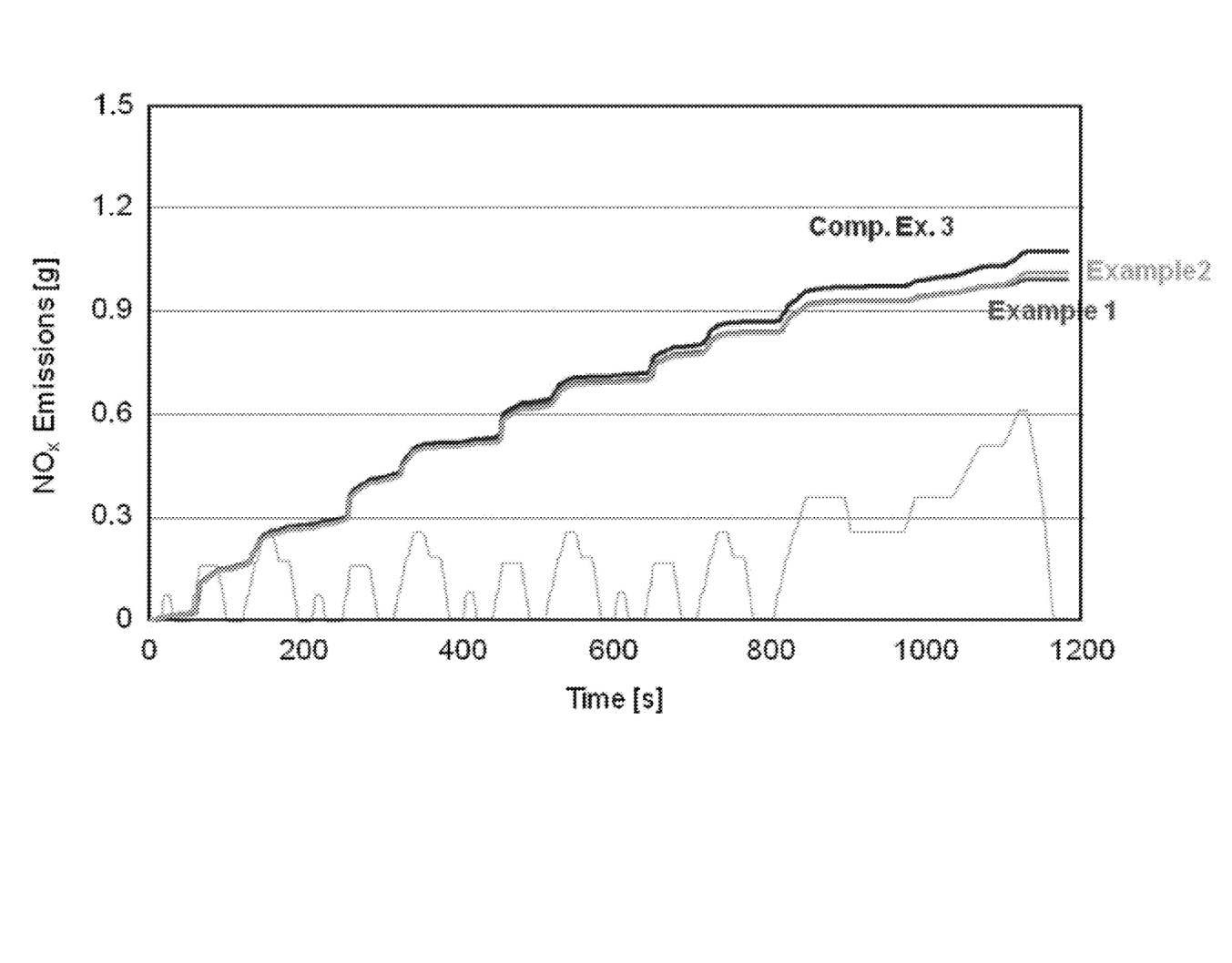
The FIGURE is a graph showing the results from NEDC testing of two catalysts according to one or more embodiments of the invention and one comparative catalyst.

FIG. 1 displays results from NEDC testing of the catalyst compositions according to Examples 1 and 2 and Comparative Example 3, respectively, wherein the testing period in seconds is plotted on the x-axis, and the NO$_x$ emissions in grams NO$_x$ is plotted on the y-axis, and wherein the background displays the legally prescribed course of NEDC testing over the time period in terms of the variation of the motor vehicle's speed as laid down in the European Union Directive 70/220/EEC.

EXAMPLES

Example 1

A catalyst composition was prepared comprising 2 g/in$^3$ of a zeolite of the CHA structure type, said CHA-type zeolite having a silica to alumina ratio (SAR) of approximately 30 and containing 3 wt.-% of copper based on the total weight of the CHA-type zeolite, 0.475 g/in$^3$ of a zeolite of the BEA structure type, said BEA-type zeolite having a silica to alumina ratio of approximately 40 and containing 1.3 wt.-% of iron based on the total weight of the BEA-type zeolite, 0.475 g/in$^3$ of a zeolite of the MFI structure type, said MFI-type zeolite having a silica to alumina ratio of approximately 26 and containing 3.8 wt.-% of iron based on the total weight of the MFI-type zeolite and 0.1 g/in$^3$ of a zirconyl binder.

Example 2

A catalyst composition was prepared comprising 2 g/in$^3$ of a zeolite of the CHA structure type, said CHA-type zeolite having a silica to alumina ratio (SAR) of approximately 30 and containing 3 wt.-% of copper based on the total weight of the CHA-type zeolite, 0.95 g/in$^3$ of a zeolite of the BEA structure type, said BEA-type zeolite having a silica to alumina ratio of approximately 26 and containing 2.3 wt.-% of iron based on the total weight of the BEA-type zeolite, and 0.1 g/in$^3$ of a zirconyl binder.

Comparative Example 3

A catalyst composition was prepared comprising 1.35 g/in$^3$ of a zeolite of the CHA structure type, said CHA-type zeolite having a silica to alumina ratio (SAR) of approximately 30 and containing 3 wt.-% of copper based on the total weight of the CHA-type zeolite, 1.35 g/in$^3$ of a zeolite of the MFI structure type, said MFI-type zeolite having a silica to alumina ratio of approximately 26 and containing 3.8 wt.-% of iron based on the total weight of the MFI-type zeolite, and 0.3 g/in$^3$ of a silica-alumina binder.

SCR Performance Testing

DeNO$_x$ Performance of the SCR Catalysts were evaluated in transient conditions using the New European Driving Cycle, also referred to as the MVEG (Motor Vehicle Emissions Group) cycle. In particular, testing conditions were such, that the NO$_x$ fraction of the exhaust gas stream contained less than 30 wt.-% of NO$_2$ based on the total NO$_x$-content.

For testing, the catalyst compositions according to Examples 1 and 2 and Comparative Example 3 were respectively coated onto a 5.66"×5.66"×6" flow-through honeycomb substrate having a volume of 2.5 L, a cell density of 400 cells per square inch, and a wall thickness of approximately 100 µm (4 mil). The catalyst samples prepared in this fashion were then tested in an exhaust gas treatment system with a diesel oxidation catalyst (DOC) and a catalyzed soot filter (CSF) respectively located upstream from the tested catalyst.

The results from the NEDC catalyst testing are shown in FIG. 1. Thus, as may be taken from said FIGURE, the inventive catalyst according to Examples 1 and 2 which contains a combination of CHA- and BEA-type zeolites displays a clearly improved performance compared to the catalyst sample of Comparative Example 3 which only contains CHA-type zeolite. In particular, when considering the results displayed in FIG. 1, wherein the level of NO$_x$ emissions is plotted as a function of the NEDC testing period, the inventive examples 1 and 2 show a superior conversion performance compared to Comparative Example 3 both during the period from 0 to 800 s corresponding to the old European driving cycle (ECE-15), as well as during the testing period from 800 to 1200 s, corresponding to the extra-urban part of the driving cycle involving higher space velocity and higher NO$_x$ mass flow.

Consequently, the catalyst according to one or more embodiments of the present invention shows a clearly superior performance in SCR compared to a catalyst according to Comparative Example 3, and, as such, is particularly well adapted to the actual driving conditions encountered in motor vehicle use, as reflected in NEDC testing. In particular, these excellent results may be attributed to the use of a specific combination of CHA- and BEA-type zeolite materials as defined by the catalyst of the present invention.

The invention claimed is:

1. A selective catalytic reduction (SCR) catalyst for selective catalytic reduction, the SCR catalyst comprising:
   at least one zeolite of the BEA structure type;
   at least one zeolite of the CHA structure type; and
   at least one zeolite of the MFI structure type;
   wherein the at least one zeolite of the BEA structure type contains from 0.5 to 2.0 wt. % of iron (Fe) based on the weight of the at least one zeolite of the BEA structure type,
   wherein the at least one zeolite of the CHA structure type contains from 1.5 to 5.0 wt. % of copper (Cu) based on the weight of the at least one zeolite of the CHA structure type,
   wherein the at least one zeolite of the MFI structure type contains from 2.5 to 5.5 wt. % of iron (Fe) based on the weight of the at least one zeolite of the MFI structure type,
   wherein a loading of the at least one zeolite of the CHA structure type present in the catalyst is from 1.5-2.5 g/in$^3$, and
   wherein the loading of each of the at least one zeolite of the BEA structure type and of the at least one zeolite of the MFI structure type is from 0.4 to 0.6 g/in$^3$;
   wherein the total loading of the at least one zeolite of the BEA structure type and of the at least one zeolite of the MFI structure type is from 0.8 to 1.2 g/in$^3$;
   wherein the at least one zeolite of the BEA structure type, the at least one zeolite of the CHA structure type, and the at least one zeolite of the MFI structure type comprise Al and Si in their respective zeolite frameworks; wherein a molar ratio of silica to alumina (SAR) in each of the at least one zeolite of the BEA and the at least one zeolite of MFI structure type is from 23 to 30; and
   wherein the molar ratio of silica to alumina (SAR) in the at least one zeolite of the CHA structure type is from 25 to 35.

2. The catalyst of claim 1, wherein a ratio of the total weight of the at least one zeolite of the BEA structure type and of the at least one zeolite of the MFI structure type to the weight of the at least one zeolite of the CHA structure type is from 0.5 to 1.

3. The catalyst of claim 1, wherein the molar ratio of silica to alumina (SAR) in each of the at least one zeolite of the BEA and the at least one zeolite of the MFI structure type is from 25 to 27.

4. The catalyst of claim 1, wherein the molar ratio of silica to alumina (SAR) in the at least one zeolite of the CHA structure type is from 28 to 32.

5. The catalyst of claim 1, wherein said catalyst further comprises a substrate onto which the zeolites are provided, wherein the substrate is selected from the group consisting of a flow-through substrate and a wall-flow substrate.

6. The catalyst of claim 5, wherein the catalyst comprises at least one layer provided on the substrate, and the zeolites are contained in one single layer or two or more separate layers.

* * * * *

UNITED STATES PATENT AND TRADEMARK OFFICE
CERTIFICATE OF CORRECTION

PATENT NO. : 9,999,877 B2
APPLICATION NO. : 13/645100
DATED : June 19, 2018
INVENTOR(S) : Susanne Stiebels et al.

Page 1 of 1

It is certified that error appears in the above-identified patent and that said Letters Patent is hereby corrected as shown below:

In the Specification

Column 7, Line 3, "embodiements," should read -- embodiments, --.

Column 11, Line 43, "ranges ranges" should read -- ranges --;
    Line 46, "ranges ranges" should read -- ranges --;
    Line 49, "ranges ranges" should read -- ranges --;
    Line 52, "ranges ranges" should read -- ranges --; and
    Line 57, "ranges ranges" should read -- ranges --.

Column 21, Line 54, "woashcoat" should read -- washcoat --.

Signed and Sealed this
Twenty-first Day of April, 2020

Andrei Iancu
*Director of the United States Patent and Trademark Office*